United States Patent [19]

McEowen

[11] 4,088,846
[45] May 9, 1978

[54] HOLD-PLUS-INTERCOM FOR SINGLE-LINE STATIONS

[75] Inventor: James Royce McEowen, Holmdel, N.J.

[73] Assignee: Bell Telephone Laboratories, Incorporated, Murray Hill, N.J.

[21] Appl. No.: 782,931

[22] Filed: Mar. 30, 1977

[51] Int. Cl.² ............................................. H04M 1/72
[52] U.S. Cl. ................................. 179/99; 179/81 R; 179/18 AD
[58] Field of Search ........................... 179/18 AD, 99

[56] References Cited

U.S. PATENT DOCUMENTS 4,011,413  3/1977  Phillips .............................. 179/81 R Primary Examiner—William C. Cooper
Attorney, Agent, or Firm—David H. Tannenbaum

[57] ABSTRACT

An intercom system for single-line customers is disclosed which utilizes the existing nonkey telephone sets and four-conductor wiring plan together with an additional adjunct per telephone and a common control unit. Hold, broadcast intercom, and their associated visual signals are controlled by each adjunct unit which is interposed between the associated telephone set and the existing four-conductor telephone cable. Normal voice signals and supervision are transmitted using one pair of the four-conductor cable. The second pair of the cable is used for signaling between the common control unit and the adjuncts as well as for supplying power to the adjuncts. The operation of a single nonlocking key at any adjunct places the system in the intercom mode and concurrently places an active central office line on hold. Conclusion of an intercom conversation is accomplished when all telephone sets go on-hook. A held central office line is then connected to the next party to go off-hook.

28 Claims, 5 Drawing Figures

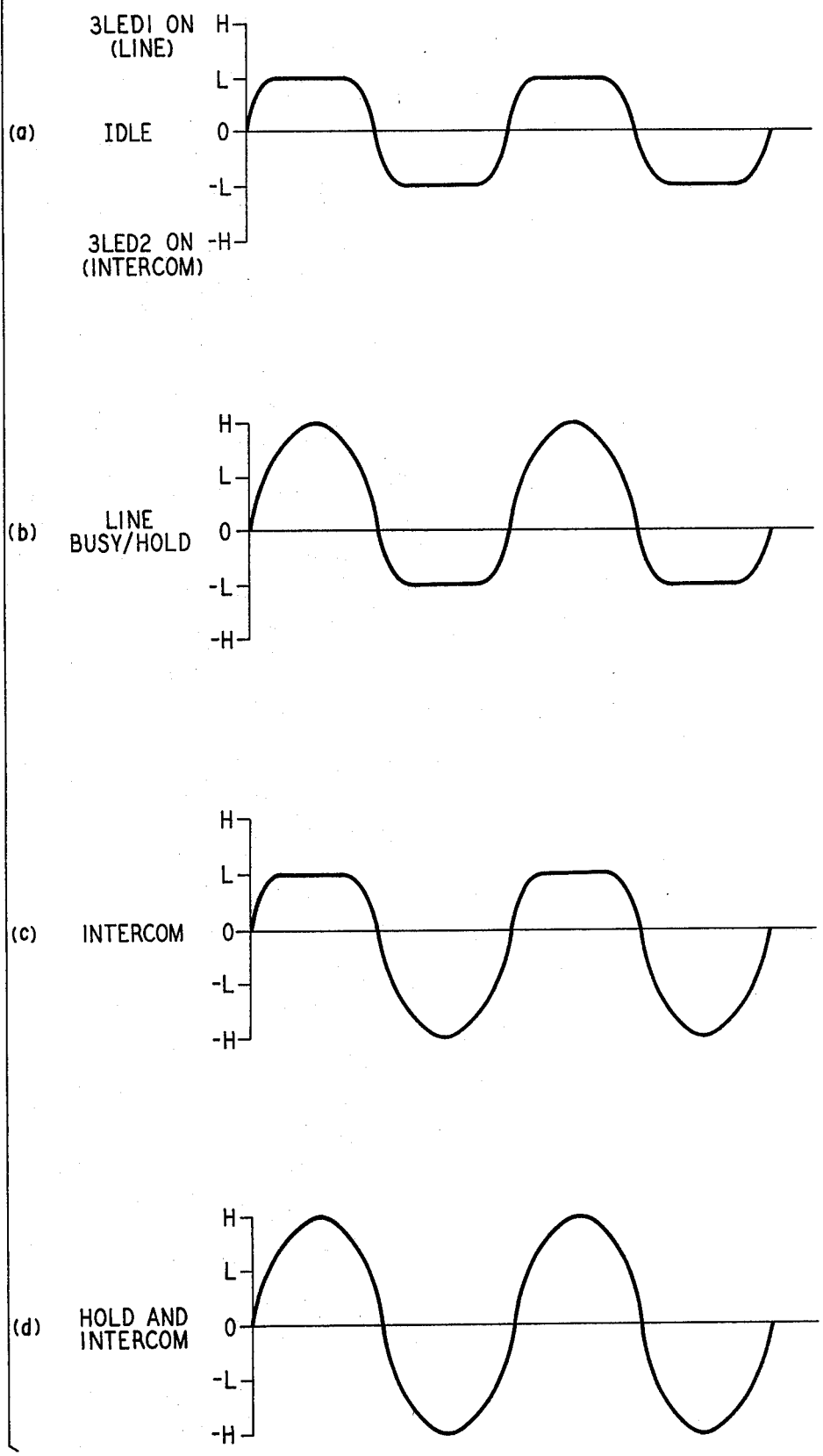

HOLD-PLUS-INTERCOM FOR SINGLE-LINE STATIONS

FIELD OF THE INVENTION

This invention relates to telephone systems and more particularly to intercommunicating systems which use existing single-line equipment for both intercom and normal telephone functions.

BACKGROUND OF THE INVENTION

Many households presently have several telephone extensions distributed throughout the house connected to a single telephone line. The extension telephones enable a party to answer or initiate a call from any of the telephone locations. The convenience of an extension telephone is enhanced by the use of an intercom system which enables the answering party to call another person to the phone by "paging" that person over the intercom rather than by shouting aloud for that person. Some home telephone adjuncts or intercom systems also provide a capability to allow the answering party to return the handset to the on-hook position and then pick up the call at another telephone location without dropping the call. Such a "hold" feature together with a "paging" capability are part of the prior intercom art. Additionally, some prior intercom art allows for signaling a busy intercom connection that an outside call is ringing (call waiting feature).

These hold, paging, and call waiting features also are available in the commercial environment in the form of key telephone systems. These key systems, however, are not always practical for single-line installations since they require key telephones, line circuits and additional wiring to provide the required functions. An intercom system to be used with a single-line installation must be economically justifiable, and thus ideally should use the existing nonkey telephones and four-conductor telephone cable that is prewired in homes.

The problem with the prior art intercom systems which are used in conjunction with an existing single-line telephone system is that some intercoms require more than the standard four-conductor telephone cable to provide an intercom function. Additionally, some intercoms require modifications to the existing telephones, while other intercoms require the addition of pushbuttons or switches to activate and release the hold, paging or call waiting features. These prior art intercom systems require separate operations to activate and release the various system features or require the use of the telephone switchhook for signaling, which is confusing and could result in dropping an active call. Thus a need exists to provide residential users with an economic intercom system which provides hold, paging and call waiting features yet is both simple to operate and reliable in its operation.

Accordingly, it is an object of my invention to simplify intercom operation by consolidating the multiple operations required to enable and disable the system features into a single pushbutton operation without using undesirable switchhook signaling.

It is another object of my invention to use existing telephones and 4-wire telephone cable as part of the intercom to minimize system cost.

It is another object of my invention to revert to normal telephone service during a commercial ac power failure at the intercom location.

It is a further object of my invention to provide positive visual feedback of system status information at each adjunct without the use of line cards or additional wiring.

SUMMARY OF THE INVENTION

In the instant application an intercom system is disclosed which meets the desired objectives. The intercom system requires an adjunct unit interposed between the existing nonkey telephone and 4-wire telephone cable. A common controller is interposed between the central office (CO) line and the existing 4-wire telephone cable. Each adjunct unit contains a single pushbutton, a speaker, line and intercom status light-emitting diodes (LEDs), and associated circuitry. The common controller consists of a hold relay, tone ring generator, power supplies for the telephone and adjunct units, and associated signaling, control, and switching circuitry.

Normal telephone voice and intercom voice together with supervision (on-hook, off-hook information) is communicated over the voice pair of the 4-wire cable. The second pair of the cable is used for bilateral signaling between the common controller and the adjuncts as well as for powering the adjuncts.

A single operation of a pushbutton at any adjunct places the system in the intercom mode and concurrently places an active central office line on hold. The enabling of the pushbutton is communicated to the common control unit by a change in the current drain over the signaling pair (second pair) of the 4-wire cable. The detection of the change in current flow at the common control unit results in placing an active central office telephone line on hold and isolating the central office line from the voice pair (first pair) of the 4-wire pair. The common controller then communicates to the adjuncts information on the status of the intercom system. At each adjunct this information is decoded and the appropriate LEDs are lighted, the line LED if there is current flow on the CO line and the intercom LED if the intercom mode is active. The speaker at each adjunct is automatically enabled during the intercom mode for broadcasting messages and is disabled when its associated telephone goes off-hook; voice transmission and reception then occurring over the telephone handset. The termination of the intercom mode occurs, automatically, when all telephone sets go on-hook, the held call being connected to the next telephone set to go off-hook.

A termination of the intercom mode, a cancellation of hold, and a return to normal telephone service results when a commercial ac power failure occurs at the intercom location.

The intercom mode can be preselected, by pressing the pushbutton before going off-hook. If the CO line was inactive then the CO line is not placed on hold but is isolated from the voice pair of the 4-wire cable. If an incoming call is received no telephone will ring since all telephones are connected to the voice pair which has been isolated from the CO line. The common controller detects the ringing voltage on the CO line and connects a ring tone generator across the voice pair thereby superimposing a ringing tone on the intercom conversation to provide a call waiting feature. The ringing CO line can then be answered by terminating the intercom call (all telephones going on-hook) and then having the party wishing to answer go off-hook.

The hold, intercom, and call waiting features provided by the hold-plus-intercom are similar to those of more sophisticated key telephone systems. These existing key systems use centralized and more complicated control circuitry with separate control leads for each key telephone, whereas my disclosed intercom uses a local control unit and common control leads to control the various system features.

Accordingly, it is one feature of my invention to provide a single-line intercom which uses the single operation of a single momentary action pushbutton for feature activation, and which is arranged to deactivate the feature selection automatically when the appropriate telephone on-hook condition occurs.

Another feature of my invention is the provision of a single-line intercom which uses existing telephones and four-conductor wiring together with a common control and one adjunct unit per telephone, while still providing lamp signaling and automatic deactivation.

Another feature of my invention is the use of one pair of the 4-wire telephone cable for existing telephone voice and supervision signals as well as for intercom voice signals, and the use of the second pair of the 4-wire cable for common signaling between the adjuncts and the common controller.

Another feature of my invention is the economic adaption of a multistation single-line telephone installation with intercom and hold capability having automatic termination of the intercom and hold modes, and having return to normal telephone service if a commercial ac power failure occurs at the intercom location.

DESCRIPTION OF THE DRAWINGS

The operation and utilization of the present invention will be more apparent from the following description taken in conjunction with the drawing in which:

FIG. 5 illustrates the coded power voltage for communicating system status information from the common controller to the adjunct units.

GENERAL DESCRIPTION

Figure 1:
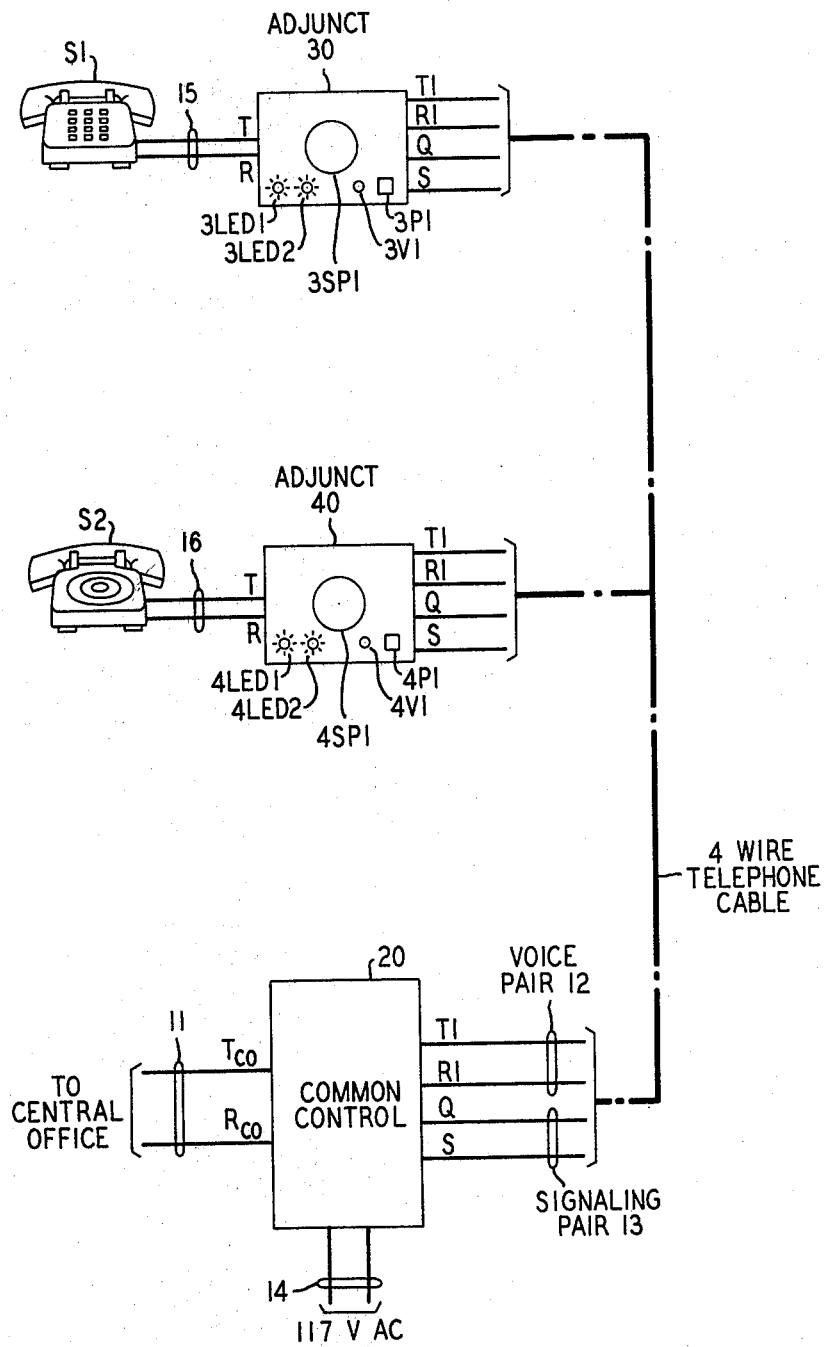
FIG. 1 shows in pictorial format a hold-plus-intercom consisting of two telephones.

In FIG. 1 there is shown a hold-plus-intercom having adjunct units 30 and 40 each associated with a respective nonkey station set S1 or S2 via a communication pair 15 or 16. While only two stations and adjuncts are depicted in FIG. 1 it should be understood that several adjuncts can be accommodated by the disclosed design. There is also shown a 4-wire telephone cable including a voice pair 12 and a signaling pair 13 which extends to adjunct units 30 and 40 as well as to a common control unit 20. A communication pair 11 extends from common control unit 20 directly to a central office or PBX switching network. External ac power is provided to common control unit 20 using line 14. Each of the adjuncts is identically equipped, as for example, adjunct 30 has a pushbutton 3P1, a volume control 3V1, a speaker 3SP1, and two light-emitting diodes designated 3LED1 and 3LED2.

The operation of the hold-plus-intercom is straightforward because system status information is displayed by light-emitting diodes LED1 and LED2 at each adjunct 30 and 40. Whenever the CO line 11 is busy (active and communicating) or on hold (active and noncommunicating) the line light-emitting diode LED1 at each adjunct is lighted. Whenever the intercom is in use, the intercom light-emitting diode LED2 at each adjunct is lighted. In this specific embodiment the line light-emitting diode LED1 is red in color and the intercom light-emitting diode LED2 is green in color, although it is understood that the assignment of color is arbitrary and does not affect system operation.

The operation of the hold-plus-intercom system is identical at all adjunct locations 30 and 40, but for simplicity the operations will be described as occurring at adjunct 30. Assume that a normal telephone call is in progress at station S1 over central office line pair 11 and that the party at station S1 desires to speak to another party within reach of the intercom system. The operation of pushbutton 3P1 at adjunct 30 places the system in the intercom mode and concurrently places the active central office line on hold. When pushbutton 3P1 is operated a change in the current flow over signaling pair 13 is communicated to common control unit 20. Common control unit 20 detects this change in current flow and enters the intercom mode placing the active central office line 11 in the active noncommunicating state (hold), isolating it from voice pair 12. The system status is then communicated from common control 20 to adjunct units 30 and 40 over signaling pair 13. At each adjunct unit 30 or 40 the status information is decoded and the appropriate light-emitting diodes are lighted.

Speakers 3SP1 and 4SP1 at the adjunct units are automatically enabled unless the associated station sets S1 or S2 are in the off-hook condition. Thus if a party at station set S1 initiates an intercom call by pressing pushbutton 3P1 of adjunct unit 30, speaker 3SP1 is not enabled since station set S1 is off-hook, however, speaker 4SP1 at adjunct unit 40 is enabled and the volume adjustment control 4V1 can be used to set the desired volume broadcast by the speaker 4SP1. The party at station set S1 can then broadcast to the on-hook intercom location S2. A party at station set S2 can only respond by going off-hook, speaker 4SP1 is then disabled, and communication occurs using the handset of station set S2. The termination of the intercom mode occurs automatically when station sets S1 and S2 both are returned to their on-hook condition, and a held call will be connected to the next station set S1 or S2 to go off-hook.

The intercom mode can be preselected by operating pushbutton 3P1 at adjunct unit 30 before going off-hook at the associated station set S1. Since, under this condition the CO line is not active, it is not placed on hold, but is isolated from voice pair 12. The light-emitting diodes at adjunct units 30 and 40 indicate the status of voice line 12 and CO line 11. If an incoming call is now received common control 20 detects the CO ringing voltage and connects a ringing tone generator to voice pair 12 thereby superimposing a ringing tone on the intercom conversation. The ringing CO line 11 is answered after termination of the intercom call, when both station sets S1 and S2 go on-hook, and when the party wishing to answer goes off-hook.

DETAILED DESCRIPTION

A discussion of the powering and signaling techniques used by the hold-plus-intercom will precede the discussion of the operation modes of the system.

Figure 2:
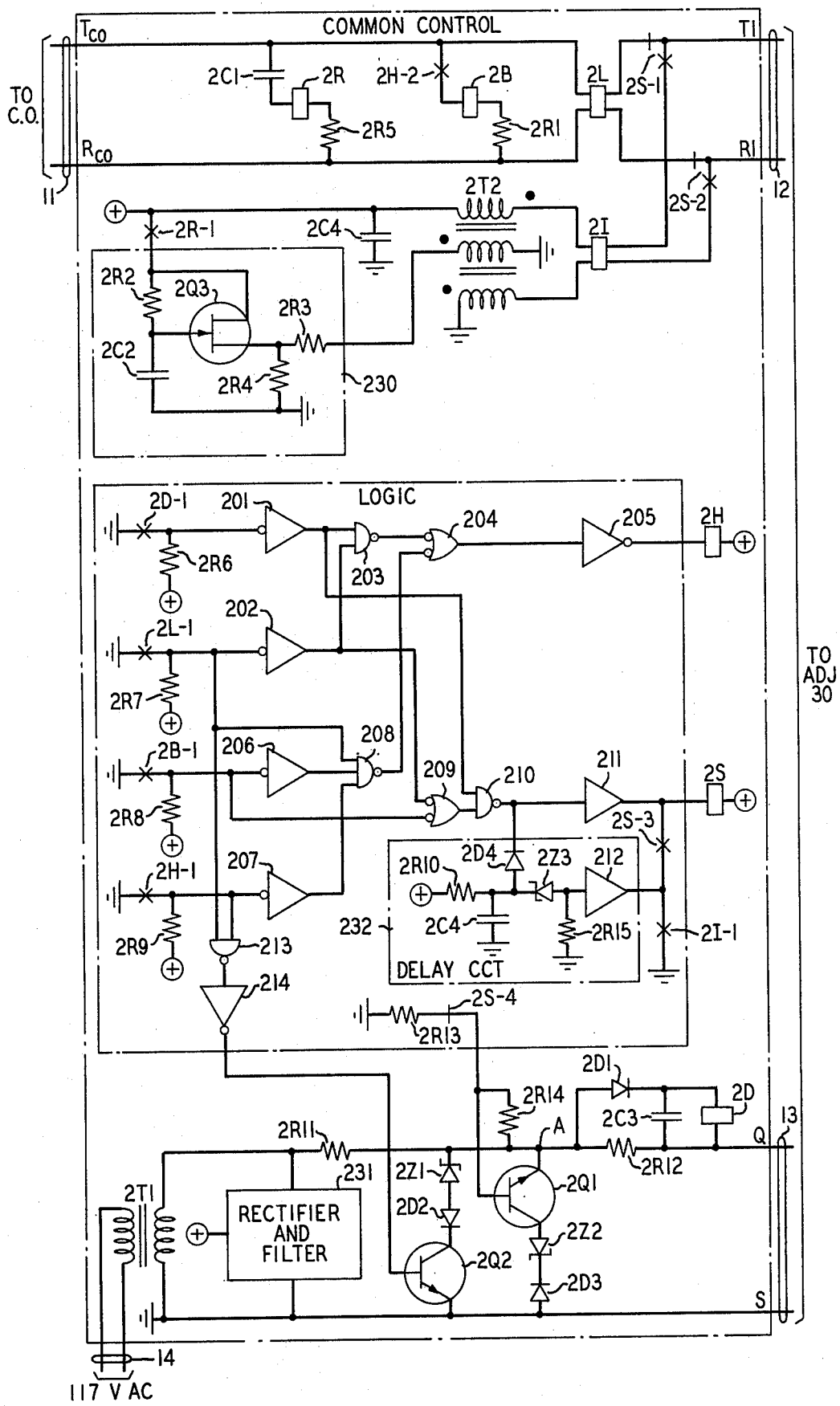
FIG. 2 and FIG. 3 are schematic drawings showing in detail the circuitry of the invention.

With reference to FIG. 2, common control unit 20 is powered from line 14 with commercial ac voltage. Transformer 2T1 steps down the commercial 117 volts ac connected to its primary to a secondary voltage of about ±30 volts peak, consistent with the voltage rating of the relays, transistors and integrated circuits used in common control unit 20 and adjunct units 30 and 40. The ac secondary voltage from transformer 2T1 is rectified and filtered, in a well known manner to provide a positive dc voltage to power the circuits of the common control unit 20. One terminal of the secondary of transformer 2T1 is connected as a ground return for common control unit 20. The nongrounded terminal of the secondary of transformer 2T1 is also connected to current limiting resistor 2R11. The other terminal of resistor 2R11 is connected to node A which has two shunt paths to ground. The first shunt path consists of zener diode 2Z1, diode 2D2 and transistor 2Q2 and the second shunt path consists of transistor 2Q1, zener diode 2Z2 and diode 2D3. The two shunting paths are used to amplitude modulate the ac voltage appearing at node A with the system status information, thereby enabling the transmission of power and status information concurrently over signaling pair 13. The encoding of the status information onto the ac voltage at node A is described below.

With reference to FIG. 5 it is seen that system status information is conveyed for the idle, line busy/hold, intercom, and hold and intercom modes. In the hold and intercom mode the ac voltage across leads Q and S of signaling pair 13 has a positive voltage amplitude of plus H (about +30 volts) and a negative voltage amplitude of minus H (about −30 volts). Referring to FIG. 2, when the system is in the hold and intercom mode transistor 2Q1 is biased in a nonconducting state; hence no current flows through its shunt path. Transistor 2Q2 is also biased in a nonconducting state and hence no current flows in the path in which it is located. Thus, the only current flowing through the current limiting resistor 2R11 is due to the current supplied to adjunct units 30 and 40 over signaling pair 13. The voltage appearing across leads Q and S has substantially the same waveshape as that appearing between the node A and ground, but is reduced slightly in amplitude by the voltage drop across resistor 2R12.

It should be noted that some existing single line installations contain a TRIMLINE or PRINCESS telephone which contain incandescent dial lights that are normally powered over signaling pair 13. In these applications the lights in the TRIMLINE or PRINCESS telephones will need to be powered individually, thus freeing pair 13 for use as a signaling pair for the hold-plus-intercom. If the dial light of the TRIMLINE or PRINCESS telephone consisted of a LED, the current requirements may be supplied by dc voltage available at each adjunct.

The value of resistor 2R12 is chosen such that the current required by the maximum number of adjunct units does not develop enough voltage across resistor 2R12 to activate the current detector comprised of diode 2D1 in series with the parallel combination of capacitor 2C3 and relay 2D. The current detector operates as follows; diode 2D1 rectifies the ac voltage developed across resistor 2R12, and capacitor 2C3 filters the rectified voltage, such that the relay 2D operates when the dc voltage across capacitor 2C3 is of sufficient magnitude. The operation of pushbutton 3P1 at adjunct unit 30 (FIG. 3) increases the current drawn over signaling pair 13 (in the manner to be described) thereby activating relay 2D. Thus relay 2D is used to detect service requests (pushbutton operations) initiated at any of the adjunct units 30 or 40.

In the intercom mode of the voltage waveform across leads Q and S of signaling pair 13 appears as shown in FIG. 5(c) having the positive voltage peak clipped at a plus L level and the negative voltage peak of minus H volts. This condition is accomplished, referring to FIG. 2, by turning transistor 2Q2 on, thus shunting current to ground when the voltage at node A exceeds the combined threshold voltage of zener diode 2Z1 and diode 2D2 and the saturation voltage of transistor 2Q2. Transistor 2Q2 is turned on to its saturation state by supplying bias current to its base terminal from the output of gate 214. Transistor 2Q1 is held in the off state by the absence of base current.

In the busy/hold mode the voltage waveform across leads Q and S of the signaling pair 13 appears as shown in FIG. 5(b), having the negative voltage peak clipped at the minus L level and the positive voltage peak at the plus H level. This condition is accomplished, referring to FIG. 2, by turning transistor 2Q1 on, thus shunting current to ground when the voltage at node A exceeds the combined threshold voltage of diode 2D3, zener diode 2Z2 and the saturation voltage of transistor 2Q1. Transistor 2Q1 is turned on to its saturation state by supplying bias current to its base terminal. The transistor 2Q2 is held in its off state by the absence of current to its base terminal.

In the idle mode the voltage waveform across leads Q and S of the signaling pair 13 appears as shown in FIG. 5(a), having both the negative and positive voltage peaks clipped at the minus L and plus L levels, respectively. This condition occurs, referring to FIG. 2, by having both transistor 2Q1 and 2Q2 turned on as a result of bias current flow to their respective base terminals. This operation occurs in the manner described in the previous intercom and busy/hold modes.

DECODING OF MODULATED POWER

Figure 3:
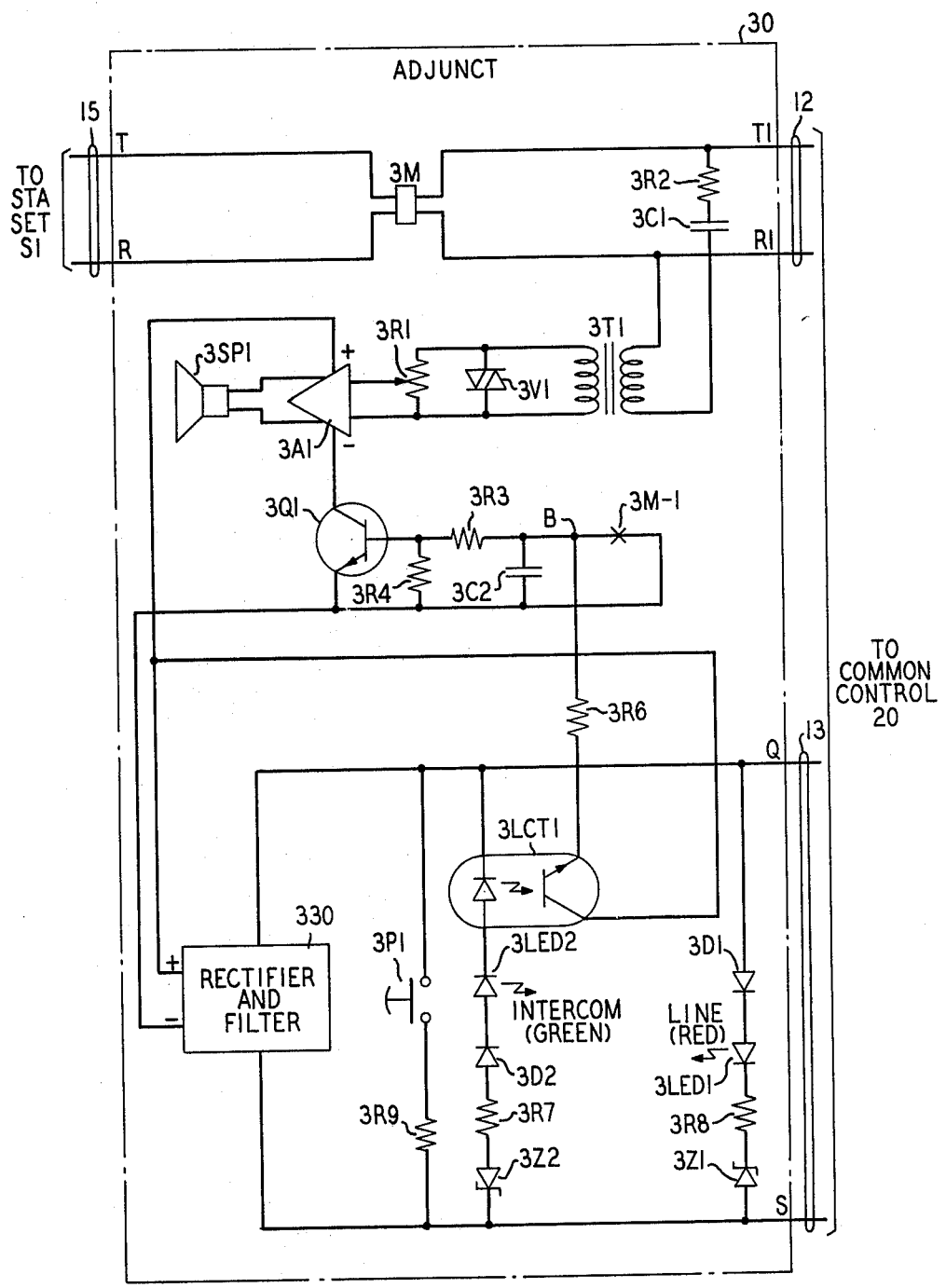

Referring to FIG. 3 the modulated power is received by adjunct 30 over signaling pair 13 and rectifier and filter 330 converts the ac voltage to a dc voltage. A positive current shunting path across leads Q and S of signaling pair 13 consists of diode 3D1, light-emitting diode 3LED1, resistor 3R8 and zener diode 3Z1. These parts are used to detect the positive ac voltage peaks at about the plus H level of FIG. 5. This plus H voltage detection level is established by the combined threshold voltage of diode 3D1, light-emitting diode 3LED1 and zener diode 3Z1. Resistor 3R8 is used to limit current flow and diode 3D1 prevents conduction during negative voltage cycles. Thus, as shown in FIGS. 5(b) and 5(d), diode 3LED1, which is red in our embodiment, lights only during the busy/hold or hold and intercom modes. In a similar manner a negative current shunting path, across the Q and S leads of signaling pair 13, consists of the diode of light-coupled transistor 3LCT1, light-emitting diode 3LED2, diode 3D2, resistor 3R7 and zener diode 3Z2 and is used to detect the negative ac voltage peaks at about the minus H level shown in FIG. 5. The minus H voltage detection level is determined by the combined threshold voltage of the diode of light-coupled transistor 3LCT1, light-emitting diode 3LED2, diode 3D2 and zener diode 3Z2. Resistor 3R7 is used to limit current flow and diode 3D2 prevents conduction during positive voltage cycles. Hence, as shown in FIGS. 5(c) and 5(d), the light-emitting diode 3LED2, green in our embodiment, lights during the intercom or hold and intercom modes. It is apparent from FIG. 5(a) and from the present discussion that when the system is in the idle mode neither light-emitting diode 3LED2 nor 3LED1 will be lighted.

A hold or intercom request from any adjunct unit 30 is initiated by the operation of pushbutton 3P1 and this information is communicated to common control unit 20 by changing the current flowing over leads Q and S of signaling pair 13. This change in current is the result of enabling pushbutton 3P1 which then shunts the Q and S leads of signaling pair 13 with resistor 3R9 which significantly increases the current drawn by adjunct unit 30. This increase in current is detected, as previously described, by common control unit 20.

VOICE COMMUNICATIONS

Both the normal telephone and intercom voice signals in addition to supervisory (on-hook/off-hook) signals are communicated over voice pair 12 between common control unit 20 and the adjunct units 30 and 40. For the following discussion it is assumed that the hold-plus-intercom is in the idle mode, that is, CO line 11 is inactive and station sets S1 and S2 are on-hook. When in the idle mode light-emitting diodes 3LED1, 3LED2 and 4LED1, 4LED2 are off at the respective adjunct units 30 and 40.

Referring to FIG. 3, since light-emitting diode 3LED2 is off no current is flowing through it and hence no current flows through the diode of the light-coupled transistor 3LCT1. Thus the associated transistor is biased off. During the intercom or hold and intercom modes, however, we recall from FIG. 5 that negative current flows in the path containing light-emitting diode 3LED2 and hence through the diode of light-coupled transistor 3LCT1 enabling current flow from the positive dc voltage terminal through the collector to the emitter of transistor 3LCT1 and through resistor 3R6 into the node B. At node B, if we assume that relay 3M is unoperated, any dc current flow into node B biases transistor 3Q1 on through resistors 3R3 and 3R4. Capacitor 3C2 is used to filter any impulse noise voltages at node B. When transistor 3Q1 is turned on it enables dc power to flow through power audio amplifier 3A1. Amplifier 3A1 can then amplify any ac signal appearing across the T1 and R1 leads of voice pair 12. Resistor 3R2, capacitor 3C1 and primary of transformer 3T1 are connected in series and provide a high impedance across the leads T1 and R1. Capacitor 3C1 couples the voice signals, and blocks the dc bias voltage, from leads T1 and R1 to the primary of transformer 3T1. Transformer 3T1 couples the voice signal received across T1 and R1 leads of voice pair 12 to the input of amplifier 3A1. A bi-directional limiter 3V1 is placed across the secondary of transformer 3T1 to limit any impulse noise on voice pair 13 from being applied to amplifier 3A1. Volume control 3R1 is a potentiometer which is used to vary amplifier 3A1 output level to speaker 3SP1.

Relay 3M is a dual winding current sensing relay which has one winding placed in series between the T1 lead of voice pair 12 and the T lead of pair 15, and a second winding placed in series between the R1 lead of voice pair 12 and the R lead of pair 15. Relay 3M provides a balanced low impedance and does not significantly attenuate the bi-directional voice signals communicated through it between the voice pair 12 and pair 15. Relay 3M detects off-hook conditions by detecting the dc current flow to the associated telephone set S1 over the T and R leads of pair 15. When relay 3M is operated, enabled make contact 3M-1 shunts any bias currents into node B through resistor 3R6 to the negative dc terminal thus preventing transistor 3Q1 from turning on. As a result, amplifier 3A1 is inhibited when the associated station set S1 is off-hook.

Referring to common control unit 20 of FIG. 2 and assuming an idle mode (all station sets S1 and S2 on-hook and CO line 11 inactive) relay 2L will be unoperated. Relay 2L is a dual winding current sensing relay which has one winding placed in series between the T1 lead of voice pair 12 and the TCO lead of the CO line 11, and has a second winding connected in series with the R lead of voice pair 12 and the RCO lead of the CO line 11. Relay 2L detects the occurrence of an off-hook condition at either station set S1 or station set S2 when the system is not in the intercom mode (that is, relay 2S is not operated). Relay 2L provides a balanced low impedance to signals transmitted bi-directionally between CO line 11 and voice pair 12. When the system goes into the intercom mode, relay 2S operates in the manner to be described and enabled transfer contacts 2S-1 and 2S-2 isolate relay 2L from the T1 and R1 leads of the voice pair 12 and connect relay 2I across the T1 and R1 leads of voice pair 12. Relay 2I performs the same supervisory function during the intercom mode that relay 2L performs when not in the intercom mode. That is, relay 2I detects off-hook conditions of the station sets S1 and S2 during the intercom mode. Wired in series with each of the two windings of relay 2I is a winding of transformer 2T2. The other terminal of one winding of the transformer 2T1 is connected to the positive dc voltage supply and the other terminal of a second winding of transformer 2T1 is connected to the ground return. Transformer 2T2 provides a low resistance to the dc voltage but a high ac impedance so as not to attenuate any voice signal appearing between leads T1 and R1 of voice pair 12. Capacitor 2C4 is used to bypass the dc power supply to any ac currents flowing through transformer 2T2. A third winding of transformer 2T2 is connected between output resistor 2R3 of ring tone generator 230 and the ground return. The third winding of transformer 2T2 is used to couple the ring tone generator output to the T1 and R1 leads of voice pair 12.

Resistors 2R2, 2R3 and 2R4, capacitor 2C2 and unijunction transistor 2Q3 form a ring tone generator 230. The dc power to ring tone generator 230 is applied through make contact 2R-1 from the positive dc voltage supply. Relay 2R is operated only when ringing currents appear on the CO line 11. The manner of operation of this relaxation oscillator is well known. The output of ring tone generator 230 is placed across resistor 2R4 and is coupled to the third winding of transformer 2T2 by resistor 2R3.

The winding of relay 2B in series with resistor 2R1 constitutes a hold impedance which is placed across CO line 11 by make contact 2H-2 when relay 2H is operated. Relay 2H is activated when the system is in the hold mode. Relay 2R is operated when an ac ringing tone is applied to CO line 11 and capacitor 2C1 blocks any dc voltage across CO line 11 from reaching relay 2R. Resistor 2R5 is selected to provide a high impedance so that voice signals appearing on Co line 11 are not substantially attenuated, while still allowing relay 2R to operate when ringing voltages appears on CO line 11.

LOGIC CIRCUITRY

The logic circuitry depicted in FIG. 2 can be implemented using any of a number of logic families which can operate at the dc voltage available and with capability to drive the associated relays 2H and 2S and power transistors 2Q1 and 2Q2. The operation of the logic circuitry will be described in conjunction with the description of the various operating modes of the hold-plus-intercom system depicted in FIG. 4.

IDLE MODE

During the idle mode relays 2R, 2B, 2L, 2I, 2H, 2S, and 2D of common control unit 20 shown in FIG. 2 are not operated and light-emitting diodes 2LED1 and 3LED2 of adjunct unit 30 shown in FIG. 3 are not lighted. With reference to FIG. 2, when ringing voltages are applied to CO line 11, relay 2R operates thus providing dc power to ring tone generator 230 via enabled make contact 2R1. The output of ring tone generator 230 is not connected to the T1 and R1 leads of voice pair 12 because relay 2S is not operated and hence transfer contacts 2S-1 and 2S-2 are open, isolating the ring tone from the voice pair 12. The ringing signal received over the CO line 11 is communicated through the winding of relay 2L and via break contacts 2S-1 and 2S-2 to the T1 and R1 leads of the voice pair 12. At adjunct unit 30, of FIG. 3, the ringing signal is received over the voice pair 12 and is communicated through the winding of relay 3M to the T and R leads of pair 15 to the ringer of telephone set S1. If station set S1 goes off-hook to answer a ringing line, or to initiate a call, the system will enter the central office line busy (busy) mode shown in FIG. 4.

BUSY MODE

Figure 4:
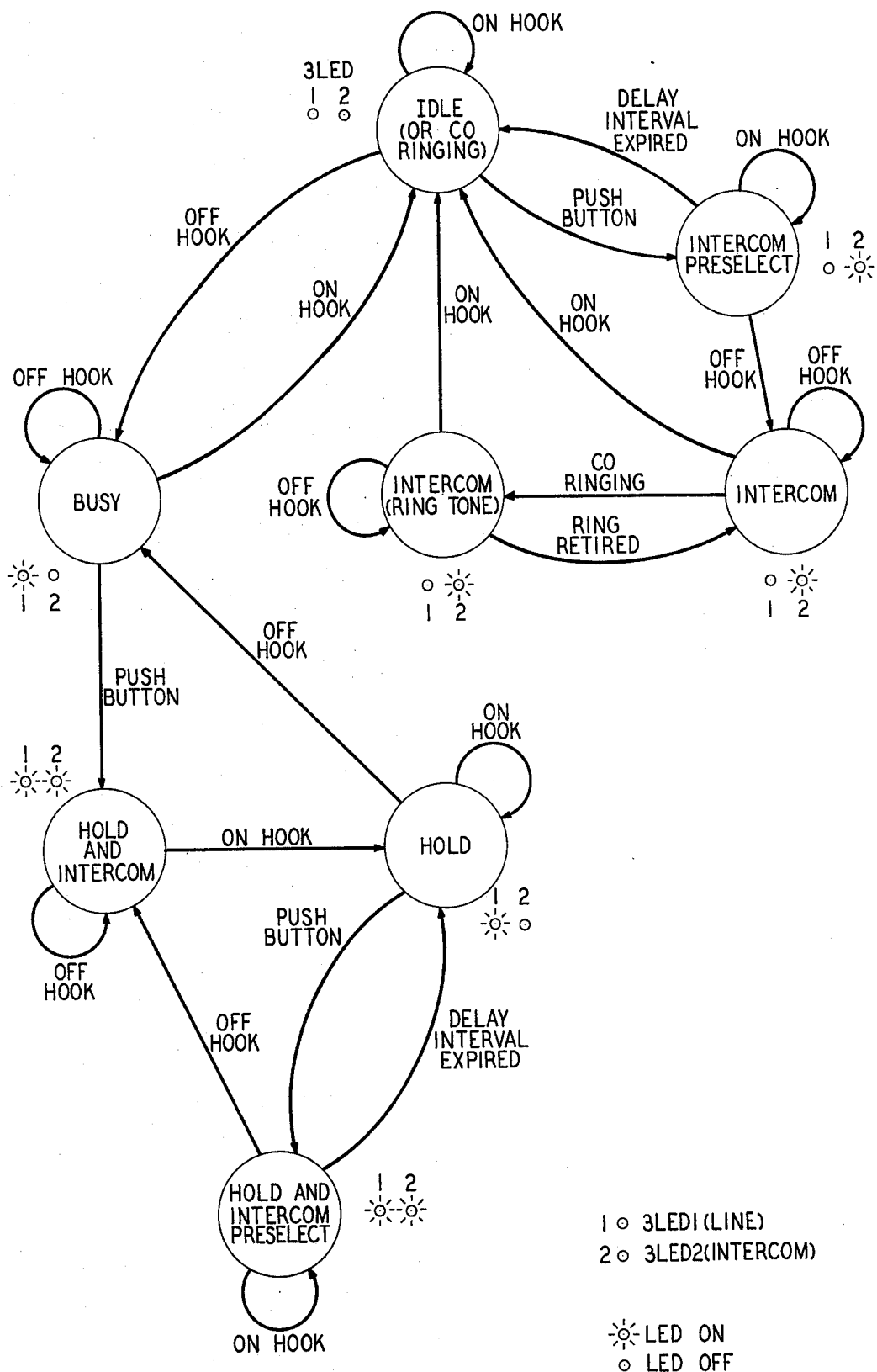
FIG. 4 shows pictorially the operational mode diagram of the intercom system.

Relay 2L in common control unit 20 shown in FIG. 2 detects the dc current flow over the voice pair 12 that accompanies an off-hook condition at station set S1. When relay 2L operates, make contact 2L-1 communicates a ground, or logic 0, input to inverter 202 as well as to one output of the two-input NAND gate 213 and to one input of the three-input NAND gate 208. The output of gate 213 then goes high, or logic 1, which high is inverted by inverter gate 214. The low from gate 214 is communicated to the base of transistor 2Q2 turning that transistor off. Thus, the positive voltage peak at node A is unclamped as illustrated by the busy/hold waveshape of FIG. 5(b). Hence, as shown by FIG. 4, light-emitting diode 3LED1 turns on at adjunct 30 (as well as at similar adjunct 40). The negative voltage at node A is clamped since transistor 2Q1 is turned on. Transistor 2Q1 is turned on since relay 2S is not operated and released break contact 2S-4 allows current flow to the base of transistor 2Q1 through resistor 2R13 from ground. The relay 2S is not operated since it requires either relays 2D and 2B operated or relay 2D operated and relay 2L not operated. Relay 2B is not operated since relay 2H is not operated.

HOLD AND INTERCOM MODE

If the party at adjunct 30 decides for some reason that the active central office call is to be placed on hold, the pushbutton 3P1 of adjunct 30 is momentarily pressed. FIG. 4 illustrates that the system then switches from the busy mode to the CO line held and intercom busy (hold and intercom) mode with both of the light-emitting diodes lighted at each adjunct. When pushbutton 3P1 is operated (FIG. 3), increased current flows over leads Q and S and this increased current flow is detected by relay 2D (FIG. 2) resulting in make contact 2D-1 closing. Note, relay 2D operates when pushbutton 3P1 is depressed. When make contact 2D-1 closes, a ground is communicated to the input of inverter gate 201 which had previously been held in the high or logic 1 state by resistor 2R6. The output of gate 201 and the output of gate 202, since relay 2L is still operated, will be at logic 1 causing the output of gate 203 to go low (logic 0), causing the output of NAND gate 204 to go high (logic 1), in turn causing the output of inverter gate 205 to go low operating relay 2H. Make contact 2H-2 closes, connecting the hold impedance consisting of the winding of relay 2B in series with resistor 2R1 across CO line 11. Relay 2B then operates from the dc current flowing over CO line 11.

At this point, relays 2L, 2D, 2H and 2B are all operated. When make contact 2B-1 operates, the input to inverter 206 goes low. This low is also supplied to one input of NAND gate 209, which was held at a logic 1 by resistor 2R8. The other input terminal of gate 209 is connected to the output of inverter 202 and remains at a logic 1 level. The output of gate 209 will be a logic 1 as a result of the ground on one of its input terminals caused by the closure of make contact 2B-1. Since the relay 2D is operated, the output of gate 201 is at logic 1. This high is communicated to one input of NAND gate 210. The second input of gate 210 is connected to the output of gate 209 and is also high, thus enabling the output of gate 210 to become a logic 0. The logic 0 output of gate 210 is communicated to noninverting gate 211, whose output enables relay 2S to operate. The output of gate 210 is also connected through diode 2D4 to a delay circuit. The operation of the delay circuit comprising resistor 2R10, capacitor 2C4, zener diode 2Z3 and noninverting gate 212 will be discussed hereinafter.

When relay 2S operates, transfer contacts 2S-1 and 2S-2 disconnected leads T1 and R1 of voice pair 12 from relay 2L and connect voice pair 12 to relay 2I. Relay 2I now operates since station set S1 is off-hook and hence a dc current flows from the positive dc supply voltage terminal through transformer 2T2 and the winding of relay 2I and over lead T1 of voice pair 12 through station set S1 and through the return path of these elements to ground. When relay 2I operates, a latching path is established for relay 2S through the closed make contacts 2S-3 and 2I-1 to ground. Thus, when the push-button 3P1 is released and relay 2D releases, relay 2S will remain operated under control of relay 2I as long as station set S1 is off-hook. With relay 2S operated, break contact 2S-4 opens thus preventing bias current from flowing through the bias resistors 2R13 and 2R14 and the base of transistor 2Q1. Transistor 2Q1 turns off thus enabling the negative voltage across leads Q and S of signaling pair 13 to reach its full voltage. Since transistor 2Q2 is still turned off the positive voltage will likewise be at the maximum value. In FIG. 5(d) the voltages occurring during the hold and intercom mode are shown. Since both the positive and negative voltages are unclipped, both light-emitting diodes at both adjunct units are lighted. FIG. 4 illustrates the hold and intercom mode with the lighted light-emitting diodes.

During the hold and intercom mode the party at station set S1, by speaking into the telephone handset, can page and broadcast messages over speaker 4SP1 at the adjunct unit associated with the other station. This is possible since the unclipping of the negative voltage turns on speaker 3SP1 at all stations other than the off-hook station. If the party at any station wishes to respond, that person must go off-hook at a station set and use the handset thereat. Note there is no change of the system operating mode when this occurs and hence both light-emitting diodes at all adjunct units remain lighted. Termination of the hold and intercom state occurs when all station sets return to the on-hook position, the system then returns to the hold mode (FIG. 4).

HOLD MODE

As illustrated in FIG. 4, during the hold mode only the line light-emitting diodes 3LED1 and 4LED1 remain lighted. The switching of the system status to the hold mode is accomplished in the following manner. Referring to FIG. 2, when all station sets return to the on-hook position, current flow over leads T1 and R1 of voice pair 12 is interrupted and relay 2I releases opening make contact 2I-1, thereby releasing relay 2S. This occurs since the current path from gate 211 was disabled when relay 2D released. The release of relay 2S will transfer, via transfer contacts 2S-1 and 2S-2, the T1 and R1 leads of voice cable 12 from the connection to relay 2I to a connection to relay 2L. Thus, voice pair 12 is again connected to the CO line 11. With relay 2S not operated, break contact 2S-4 allows base bias to transistor 2Q1 resulting in the clamping of the negative portion of the ac voltage on the signaling pair 13. Positive portion of the ac voltage remains unclamped since relay 2H is still operated. FIG. 4 illustrates that going on-hook from the hold and intercom mode places the system in the hold mode, the change in state being indicated by the light-emitting diode status as shown. During this hold mode with all station sets on-hook the next station to go off-hook will transfer the system from the hold mode to the busy mode. As shown by FIG. 4, there are no associated changes in the indications when the system switches from the hold to the busy mode, but if such were desirable, then additional circuitry at common control unit 20 could provide a distinguishable winking hold signal for the hold mode.

INTERCOM OPERATION

Several problems exist with a single button system. Namely, if any station handset goes off-hook, it will become connected to the CO line. Thus, for intercom operation, the pushbutton must be operated prior to going off-hook. Since, from a human factors standpoint, it would be difficult to require a person to keep the button down until the handset is removed, provision must be made to bridge the delay from the time the pushbutton is released until the handset is detected off-hook. This delay is accomplished by delay circuit 232 shown in FIG. 2. When the pushbutton 3P1 is operated, the system responds as discussed above with relay 2D operating causing the output of gate 210 to go low. The output of gate 210 discharges capacitor 2C4 through diode 2D4 to a logic 0 level. Capacitor 2C4 having been previously charged to a logic 1 level, through resistor 2R10, enabled current flow through zener diode 2Z3 and resistor 2R15 to ground, which biased buffer gate 212 such that its output was at a logic 1 state. With capacitor 2C4 now discharged, its voltage will not sustain current flow through zener diode 2Z3 and thus the bias voltage developed across resistor 2R15 is at a logic 0 level. The output of buffer gate 212 is likewise at a logic 0 or ground potential, and when make contact 2S-3 closes, due to relay 2S operating, the output of buffer gate 212 momentarily maintains relay 2S operated. When pushbutton 3P1 is released, relay 2D releases and make contact 2D-1 opens resulting in the output of gate 201 going to logic 0 thus disabling gate 210. The output of gate 210 then goes to logic 1 thus back biasing diode 2D4 and causing the output of gate 211 to go to a logic 1 voltage. Relay 2S remains operated via gate 212. With diode 2D4 back biased, no current flows through diode 2D4 and capacitor 2C4 becomes charged by current flowing through resistor 2R10. When the voltage across capacitor 2C4 reaches a level greater than the breakdown potential of zener diode 2Z3, zener diode 2Z3 conducts allowing current flow through it to ground via resistor 2R15. Thus, buffer gate turns off and its output stops conducting and, unless relay 2I has operated, relay 2S will release. This delay time of several seconds is proportional to the values of resistor 2R10, capacitor 2C4 and zener 2Z3. When the user goes off-hook, relay 2I operates, as previously discussed, thereby holding operated relay 2S. Note that if the user goes off-hook either without operating the pushbutton or after the time delay interval expires, relay 2S would not be operated and thus relay 2L, and not relay 2I, would operate. In this situation, the user would be connected to the CO line. If the CO line 11 had been on hold, relay 2H operated, the operation of relay 2L causes a logic 0 into gate 208 thereby causing its output to go high which together with the high from output of gate 203, since relay 2D is not operated, will cause both inputs to gate 204 to be high so as to release relay 2H. The hold circuit consisting of the winding of relay 2B and resistor 2R1 is thereby removed from the CO line. Thus, as indicated by FIG. 4, the system will switch from the hold mode to the busy mode.

INTERCOM MODE

When the system is in the idle mode, with no central office call on hold and all station sets S1 and S2 on-hook, an intercom conversation can be initiated by pressing the pushbutton at an adjunct unit. Once again the party must go off-hook before the delay interval expires, otherwise the system will return to the idle mode. If the party goes off-hook before the delay expires, the system switches into the intercom mode. This is accomplished as discussed priorly with respect to the situation when the CO line is active (on hold), except that now relay 2H is unoperated. In addition, relays 2R, 2B, 2L, 2I, 2D and 2S are not operated while in the idle state. Thus, make contact 2L-1 is open and hence the input to inverting gate 202 is logic 1 and its output is at logic 0. The logic 0 output of gate 202 is connected to one input terminal of NAND gate 209. Gate 209 operates as an OR gate to logic 0 signals and hence its output is at logic 1 thus providing a logic 1 input to NAND gate 210. When pushbutton 3P1 is depressed, relay 2D operates as previously described and make contact 2D-1 closes placing a logic 0 on inverting gate 201. The output of gate 201 will become a logic 1 which is communicated to a second input of gate 210, the other input to gate 210 previously being at a logic 1 the output of gate 210 switches to a logic 0 thereby enabling relay 2S. The system is then in the intercom mode and broadcast communication is possible.

CO RINGING

With reference to FIG. 2, we note while in the intercom mode CO line 11 is isolated by transfer contacts 2S-1 and 2S-2 from voice pair 12. If a ringing signal is connected to CO line 11, the ringing voltage will be isolated from voice pair 12 and hence the ringers at the station sets will not ring. Relay 2R, however, will operate in response to this ac ringing voltage. When relay 2R operates, make contact 2R-1 closes connecting the dc supply voltage to ring tone generator 230 which will then couple its generated tone output through the winding of transformer 2T2 and through the winding of relay 2I to voice pair 12. The parties to the intercom conversation will hear this generated ringing signal superimposed on their conversation, thus providing a call waiting feature. To answer the call all parties must first return to the on-hook condition and then the party desiring to answer the ringing line must go off-hook.

FIG. 4 illustrates the change of system mode associated with the events described. Note that the light-emitting diodes do not display the ringing status although such a feature could be incorporated into common control unit 20 design. When all parties go on-hook, the system returns to the idle mode from the intercom mode and when a party subsequently goes off-hook to answer the ringing call the system will switch to the busy mode.

Referring to FIG. 2, we note that when all stations go on-hook, to terminate the intercom call, relay 2I releases. Break contact 2I-1 opens, thus interrupting the current flow to relay 2S which relay then releases. The transfer contacts 2S-1 and 2S-2 reconnect voice pair 12 to the CO line 11 and the break contacts 2S-4 again biases on transistor 2Q1 resulting in the voltage waveshape illustrated for the idle mode FIG. 5(a) and hence all light-emitting diodes are off at all adjunct units.

POWER FAILURE OPERATION

In the event of a commercial power failure, it is desirable to have the hold-plus-intercom system revert to normal telephone service. This is accomplished, referring to FIG. 2, in the following manner. When a commercial ac power failure occurs, the dc output voltage from rectifier and filter circuit 231 of common control unit 20 drops to zero volts, and in addition no ac voltage is available to transmit to the adjunct units over signaling pair 13. Hence, relay 2D could not remain operated and all light-emitting diodes at the adjunct would go off. With no dc supply voltage, relays 2I, 2S and 2H would release since they require operating current from the dc supply. When relay 2S releases, the voice pair 12 will be reconnected through relay 2L to CO line 11, irrespective of the mode in which the system had previously been operating.

Thus, during the absence of commercial ac voltage, the station sets S1 and S2 will be connected to the CO line and will have normal telephone service, a desirable situation under the circumstances.

CONCLUSION

While the embodiment discussed is a two station system, the invention is not confined to use in such a system but can be used with any reasonable number of stations on a single line. In addition, each station set need not have an adjunct unit associated with it as shown in the discussed embodiment, however, such stations would not be able to initiate an intercom or hold feature but could still participate in the intercom connection. Of course, a station set without an adjunct unit can still perform normal telephone functions. Although in the embodiment discussed, the common control unit provides power to the adjunct units, such power for the adjuncts can be locally provided without deviating from the scope of my invention. Furthermore, as discussed herein, the addition of circuitry at the common control unit may be made to provide a wink signal to distinguish a hold indication from a busy indication. Also, an added toggle switch may be provided at each adjunct to allow its amplifier and speaker to be enabled while the telephone handset is off-hook. Thus, the telephone conversation over the handset would also be heard over the speaker, providing a feature similar to that available with a "SPOKESMAN" telephone adjunct.

It is to be understood that the circuit described is merely illustrative of the principles of my invention. A wide variety of modifications thereto may be effected by persons skilled in the telephone art without departing from the spirit and scope of my invention.

What is claimed is:
1. An intercommunication system for use with
   at least two telephone stations, interconnected by a multipair cable, said cable having first and second wire pairs, and means for connecting a central office telephone line to said first wire pair, said intercommunicating system comprising:
   a first adjunct unit interposed between a first said telephone station and said cable,
   a second adjunct unit interposed between a second said telephone station and said cable,
   each said adjunct unit including;
   a momentary action pushbutton for initiating hold and intercom requests,
   a speaker for paging intercom messages,
   means for activating said speaker in response to the operation of said pushbutton at any said adjunct unit,
   means for disabling said speaker when said associated telephone station goes off-hook, and
   means for receiving system status signals over said second wire pair,
   a common control unit interposed between said central office line connecting means and said cable,
   said common control unit including;
   means for transmitting system status signals to said adjunct units over said second wire pair,
   means for placing a connected active central office telephone line on hold in response to the operation of said pushbutton at any said adjunct unit,
   means for disconnecting a connected said central office line from said first wire pair in response to the operation of said pushbutton at any said adjunct unit,
   means for providing power to said telephone stations over said first wire pair when said central office line is disconnected, and
   means for restoring connection between said first wire pair and said central office line in response to all said telephone stations going on-hook.
2. The invention of claim 1 wherein said common control unit includes means for applying ringing signals on said first wire pair in response to ringing potential on said central office line when said central office line is disconnected from said first wire pair.
3. The invention of claim 2 wherein said common control unit includes means operative in conjunction with said restoring means for terminating said hold connection when all said telephone stations go to an on-hook condition and when one of said stations thereafter goes to the off-hook condition.

4. The invention of claim 3 wherein said common control unit includes means for providing power for said adjuncts over said second wire pair.

5. The invention of claim 4 wherein said means for providing adjunct power includes,
means for extending ac voltage to each said adjunct over said second wire pair, and
means for modulating said extended ac voltage with system status signals representative of said hold and intercom modes.

6. The invention of claim 5 wherein said common control unit includes means for reverting to normal telephone operation when the ac voltage fails.

7. The invention of claim 5 wherein said means for providing adjunct power includes means for limiting either the positive or negative half wave of said ac voltage.

8. The invention of claim 1 wherein said system status receiving means includes means for controlling lamp indications at each said adjunct unit.

9. The invention of claim 8 wherein said means for controlling lamp indications includes light-emitting diodes as part of a signal decoding circuit.

10. The invention of claim 1 wherein said adjunct units are adapted to connect to said first and second wire pairs, such that when the number of said telephone stations exceed the number of said adjunct units, said telephone stations without an associated adjunct unit can perform normal telephone operations and can participate in intercom conversations initiated by any said adjunct unit.

11. The invention of claim 1 wherein each said adjunct unit includes means for changing current flow over said second wire pair in response to the operation of said pushbutton at said adjunct unit, and said common control unit includes means for detecting changes in current flow over said second wire pair.

12. An intercommunication system for use with
at least two telephone stations, interconnected by a multipair cable, said cable having first and second wire pairs, and means for connecting a central office telephone line to said first wire pair, said intercommunicating system including a first adjunct unit interposed between a first said telephone station and said cable, a second adjunct unit interposed between a second said telephone station and said cable, a common control unit interposed between said central office line connecting means and said cable,
said adjuncts each including a momentary action pushbutton for initiating hold and intercom requests, a speaker for paging intercom messages, two lamps for displaying system status information, each said adjuncts further including
means for connecting said adjunct unit between said telephone and said cable, said connecting means arranged so that voice and supervisory signals are communicated over said first wire pair and system status and control signals are communicated over said second wire pair,
means for transmitting control signals by changing the current flow to said adjunct unit over said second wire pair in response to an operation of a momentary action pushbutton at said adjunct unit,
means for converting an ac voltage which is modulated with system status information and which is received over said second wire pair to provide dc power for said adjunct unit,
means for demodulating said modulated ac voltage to provide visual system status indications using said lamps as well as to enable said speaker for paging intercom messages, and
means for disabling said speaker when said associated telephone station goes off-hook,
said common control unit adapted to control communication connection between said central office line and said telephone stations, said common control unit including
means for connecting said common control unit between said central office telephone line and said multipair cable,
means for transmitting said modulated ac voltage as system status information and power for said adjunct units over said second wire pair,
means for receiving said control signals from said adjunct units over said second wire pair, said control signals being controlled by the operation of a pushbutton at any said adjunct unit,
means operable in response to receipt of said control signals for placing a connected active central office telephone line on hold,
means operable in response to receipt of said control signals for disconnecting a connected said central office line from said first wire pair,
means for providing dc bias power to said telephone stations over said first wire pair when said central office line is disconnected,
means for determining when all said telephone stations are on-hook, and
means operative in response to the operation of said determining means for restoring connection between said first wire pair and said central office line.

13. The invention of claim 12 wherein said common control unit includes means for reverting to normal telephone operation when the ac voltage fails.

14. An adjunct unit for use with an existing telephone station, said adjunct unit comprising:
means for connecting said adjunct unit between said telephone and a multipair cable, said cable having a first and second wire pair, said connecting means arranged so that voice and supervisory signals are communicated over said first wire pair and system status and control signals are communicated over said second wire pair,
means for signaling control information by changing the current flow to said adjunct unit over said second wire pair in response to an operation of a momentary action pushbutton at said adjunct unit,
means for converting an ac voltage which is modulated with system status information and which is received over said second wire pair to provide dc power for said adjunct unit,
means for demodulating said modulated ac voltage to provide visual system status indications as well as to enable a speaker for paging intercom messages, and
means for disabling said speaker when said associated telephone station goes off-hook.

15. The invention of claim 14 wherein said means for demodulating includes means for positive voltage detection and means for negative voltage detection.

16. The invention of claim 15 wherein each said means for detection includes a series combination of a resistor, diode, zener diode, and light-emitting diode connected across said second wire pair, the detection level determined by the combined threshold voltage of said diode, zener Diode and light-emitting diode.

17. The invention of claim 16 wherein said means for detection further includes in series with said series combination a diode of a light coupled transistor, the transistor of which is used as a power switch element in said adjunct unit.

18. A common control unit for use with a central office telephone line, said common control unit adapted to control communication connection between said central office line and a plurality of telephone stations interconnected by first and second wire pairs of a multipair cable, each said telephone station interconnected to said cable by an adjunct unit, said common control unit comprising:

means for connecting said common control unit between said central office telephone line and said multipair cable, said first wire pair of said cable being the communication pair, means for transmitting system status signals to said adjunct units over said second wire pair, means for receiving system control signals from said adjunct units over said second wire pair, said control signals being controlled by the enabling of a pushbutton at any said adjunct unit, means operable in response to receipt of said control signals for placing a connected active central office telephone line on hold, means operable in response to receipt of said control signals for disconnecting a connected said central office line from said first wire pair, means for providing dc bias power to said telephone stations over said first wire pair when said central office line is disconnected, means for determining when all said telephone stations are on-hook, and means operative in response to the enabling of said determining means for restoring connection between said first wire pair and said central office line.

19. The invention of claim 18 wherein said common control unit includes means for applying ringing signals on said first wire pair in response to ringing potential on said central office line when said central office line is disconnected from said first wire pair.

20. The invention of claim 19 wherein said common control unit includes means for terminating said hold connection when all said telephone stations go to an on-hook condition and when one of said stations thereafter goes to the off-hook condition.

21. The invention of claim 18 wherein said common control unit includes means for providing power to said adjunct units over said second wire pair.

22. The invention of claim 21 wherein said means for providing adjunct power includes, means for extending ac voltage to each said adjunct over said second wire pair, and means for modulating said extended ac voltage with system status signals representative of said hold and intercom modes.

23. The invention of claim 21 wherein said common control unit includes means for reverting to normal telephone operation when the ac voltage fails.

24. The invention of claim 21 wherein said means for providing power to adjunct units includes means for limiting either the positive or negative half wave of said ac voltage.

25. The invention of claim 24 wherein said means for limiting includes a shunting means.

26. The invention of claim 19 wherein said shunting means includes a serial connection of a resistor and an ac voltage source with two shunting circuits connected across said serial connection, each said shunting circuit including in series a transistor, diode and zener diode arranged such that a shunting circuit limits the positive peak voltage and the second shunting circuit limits the negative peak voltage when the associated transistors are independently enabled, said limit voltage of each shunt circuit being determined by the combined voltage threshold of said diode, zener diode and transistor saturation voltage.

27. The invention of claim 18 wherein said means for receiving includes means for detecting changes in current flow over said second wire pair.

28. The invention of claim 27 wherein said means for detecting includes a network in series with one lead of said second wire pair, said network including a resistor across which a serial connection of a diode and a capacitor are connected, and a current sensitive relay connected across said capacitor, said relay operates when an excess of current flows over said second pair from said common control unit.

* * * * *